J. E. BELL.
FURNACE.
APPLICATION FILED AUG. 7, 1915.
1,313,779.
Patented Aug. 19, 1919.
11 SHEETS—SHEET 8.
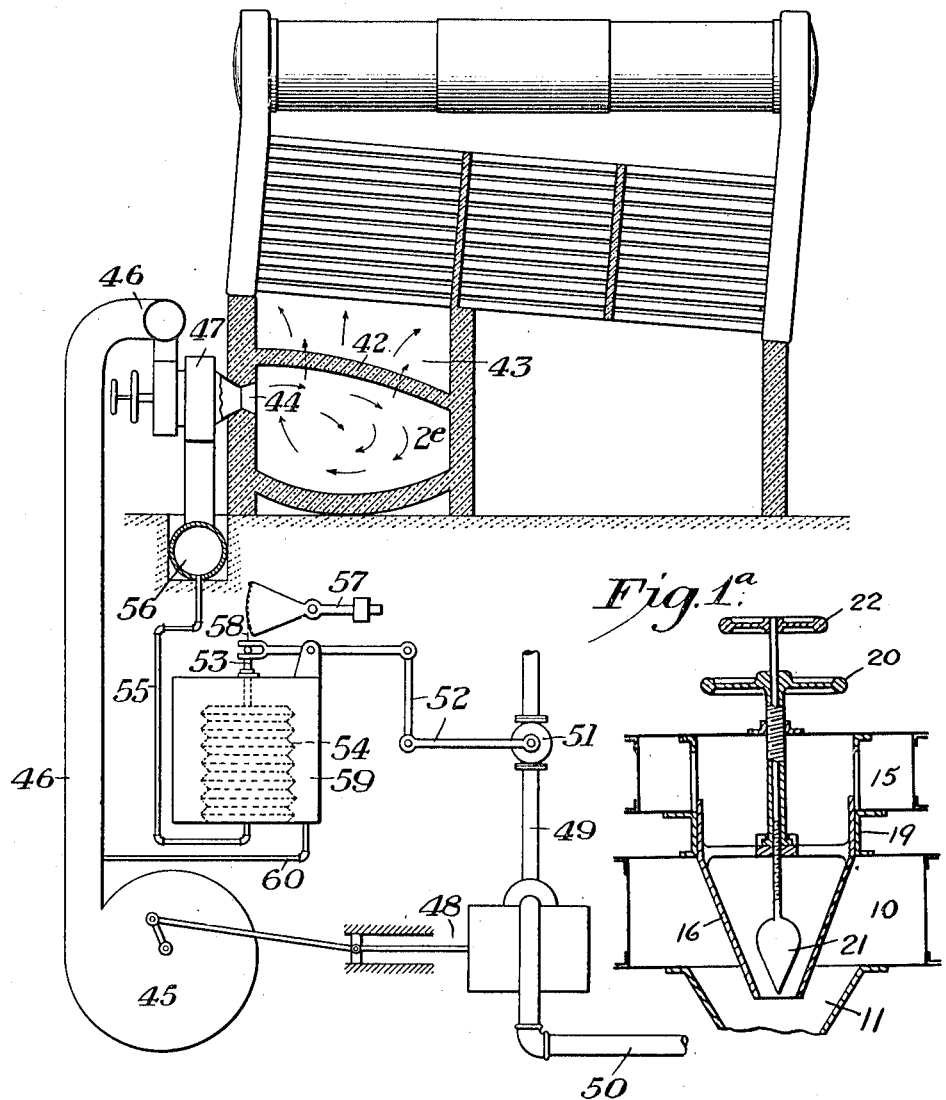
WITNESSES
INVENTOR J. E. BELL.
FURNACE.
APPLICATION FILED AUG. 7, 1915.
1,313,779.
Patented Aug. 19, 1919.
11 SHEETS—SHEET 9.
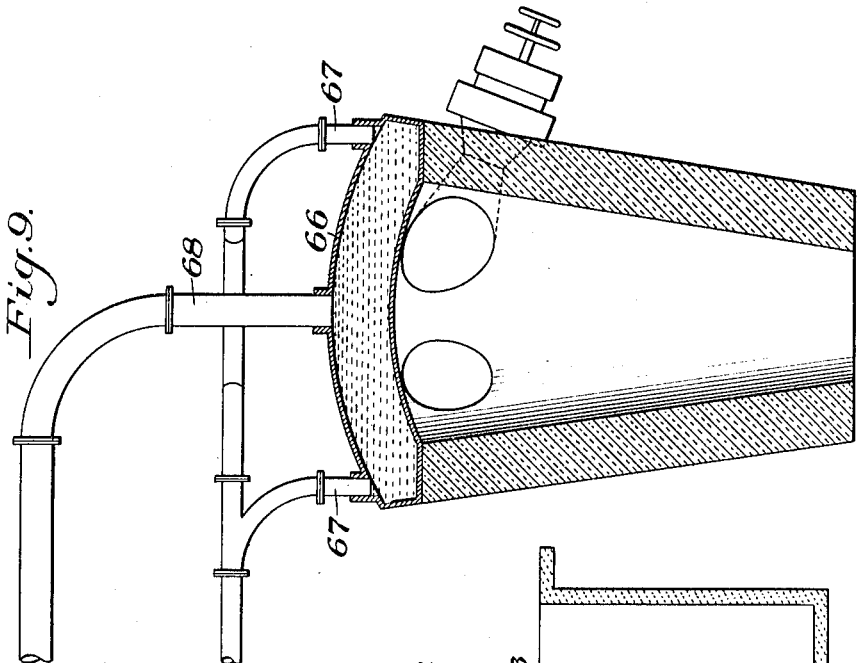
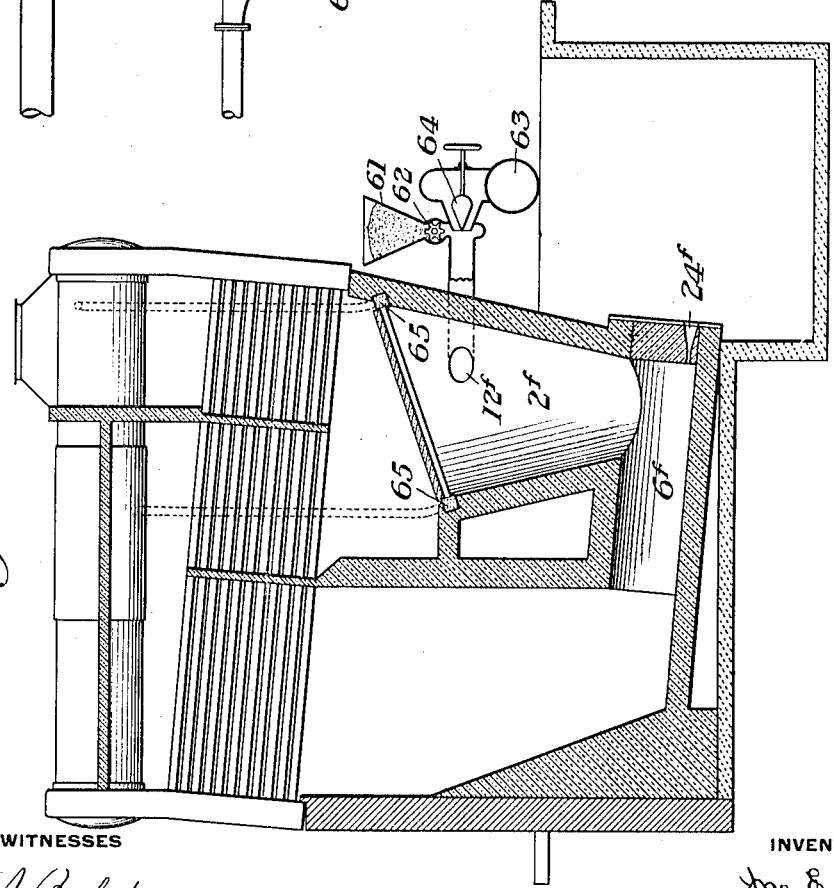
WITNESSES
INVENTOR

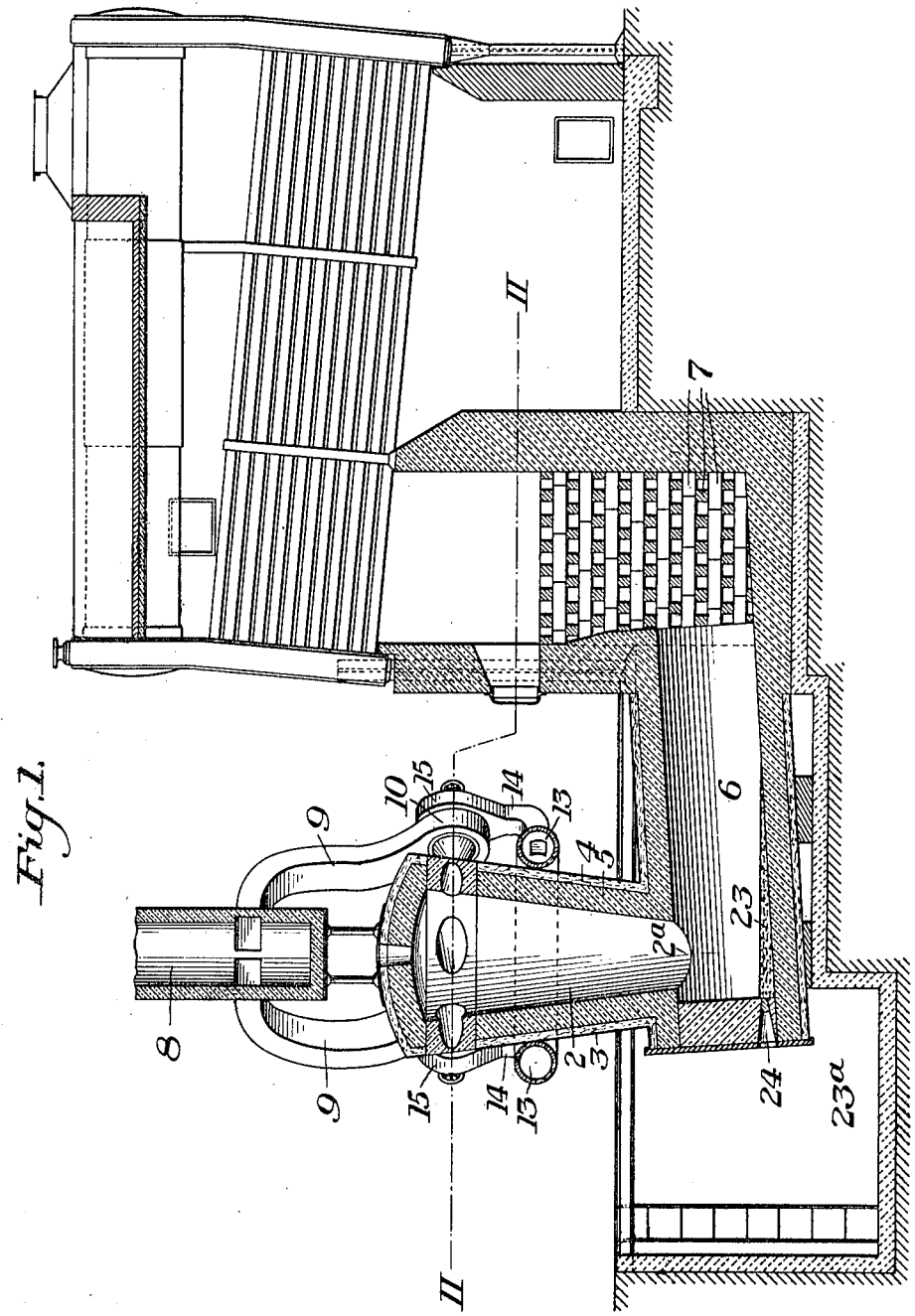

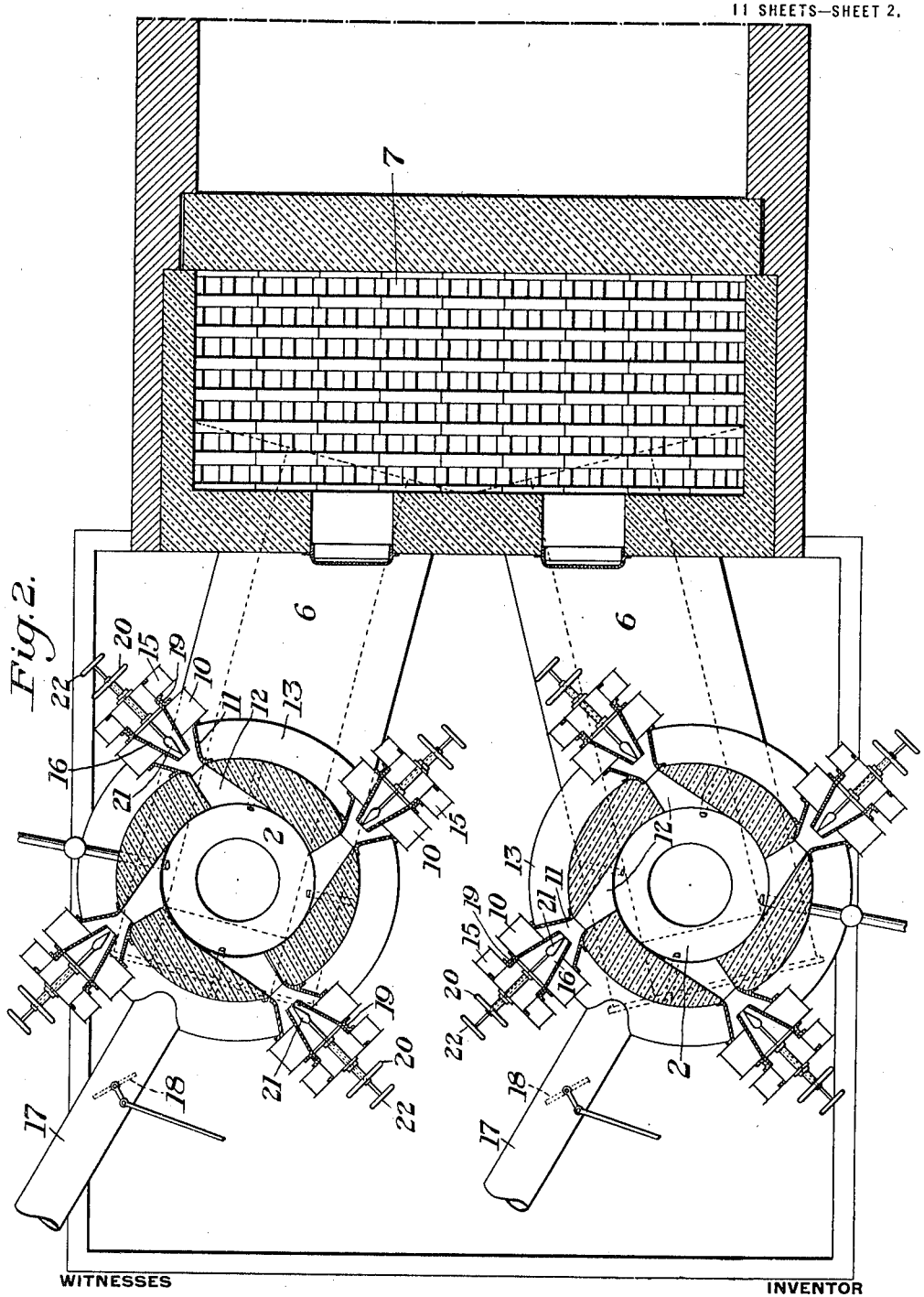

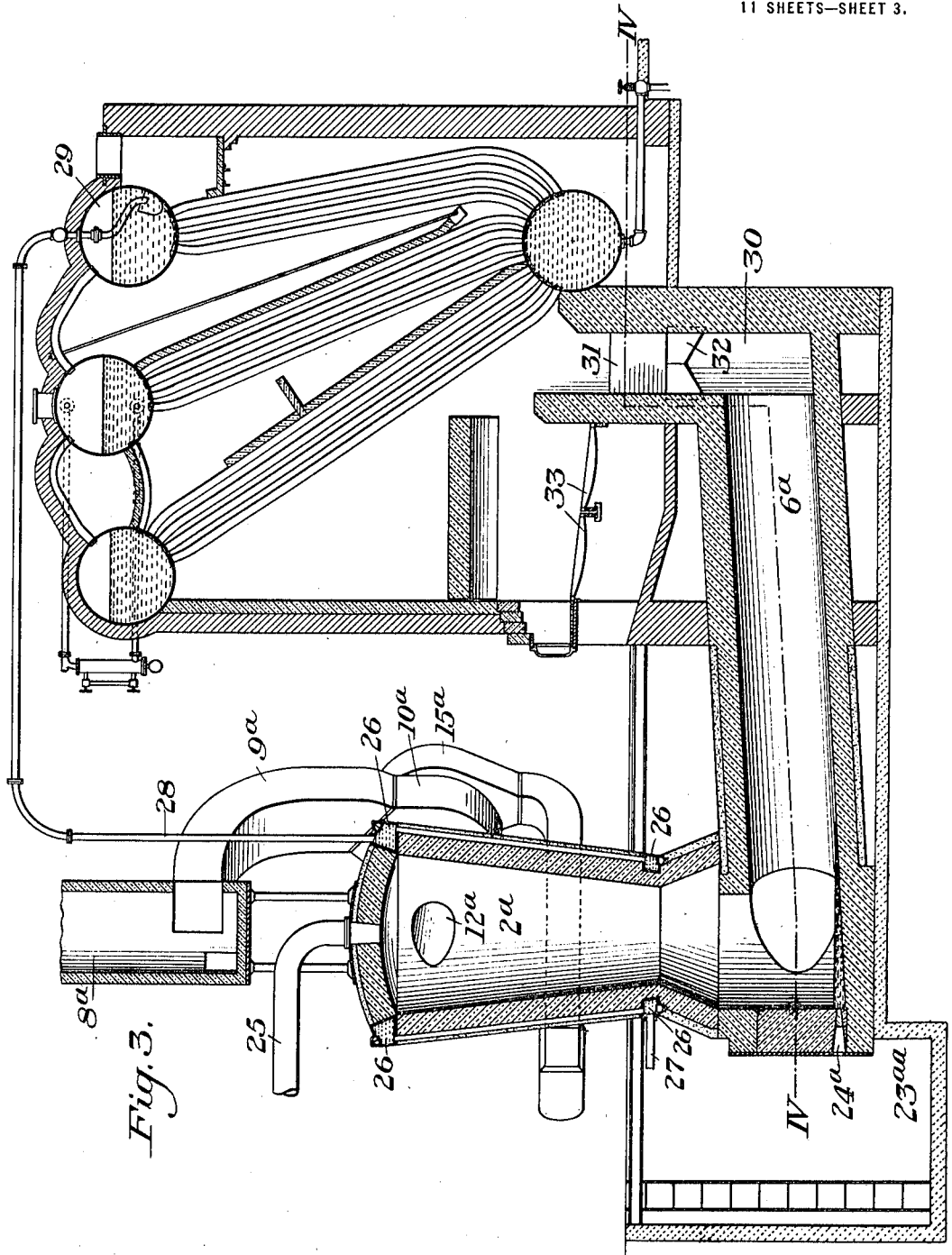

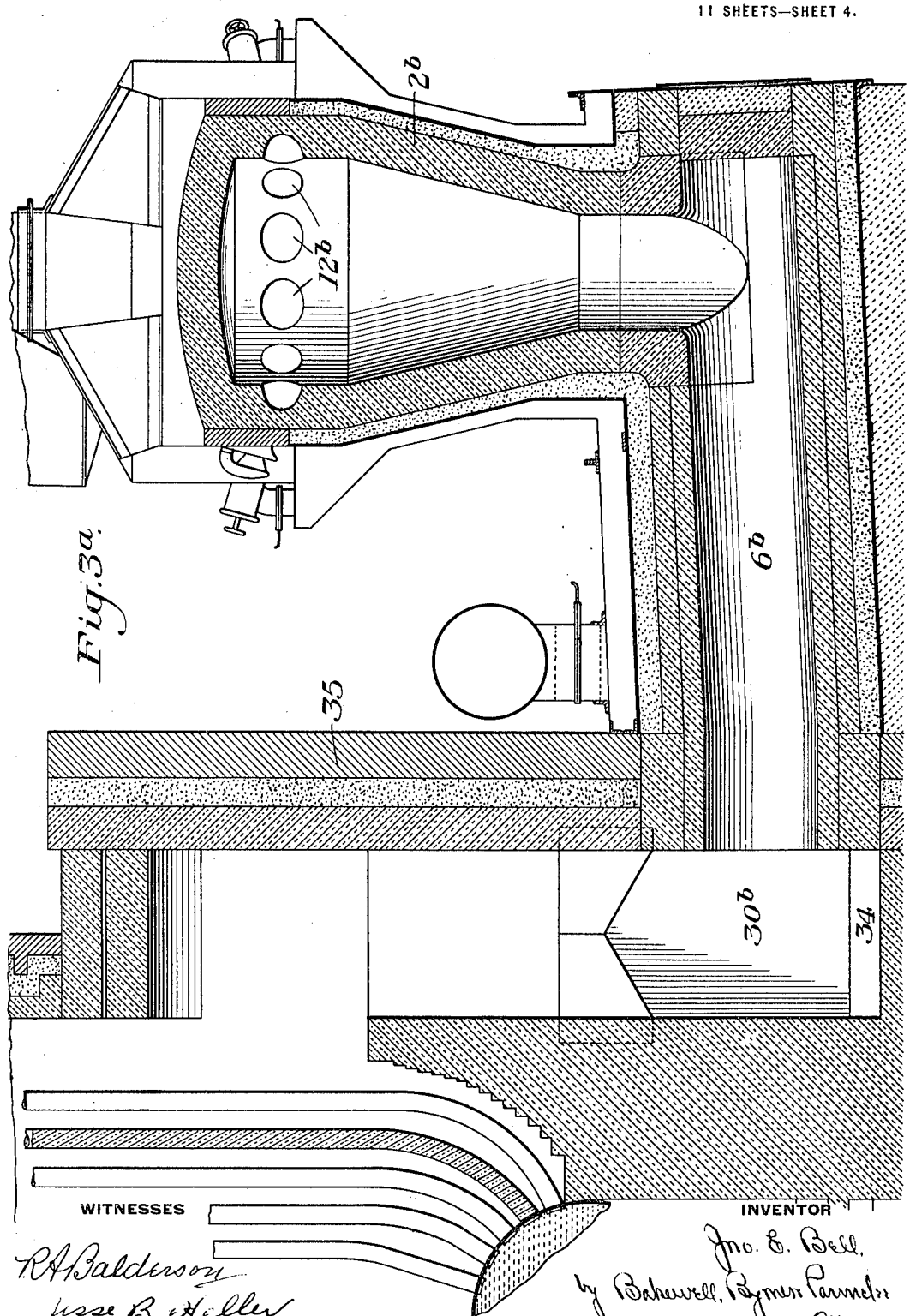

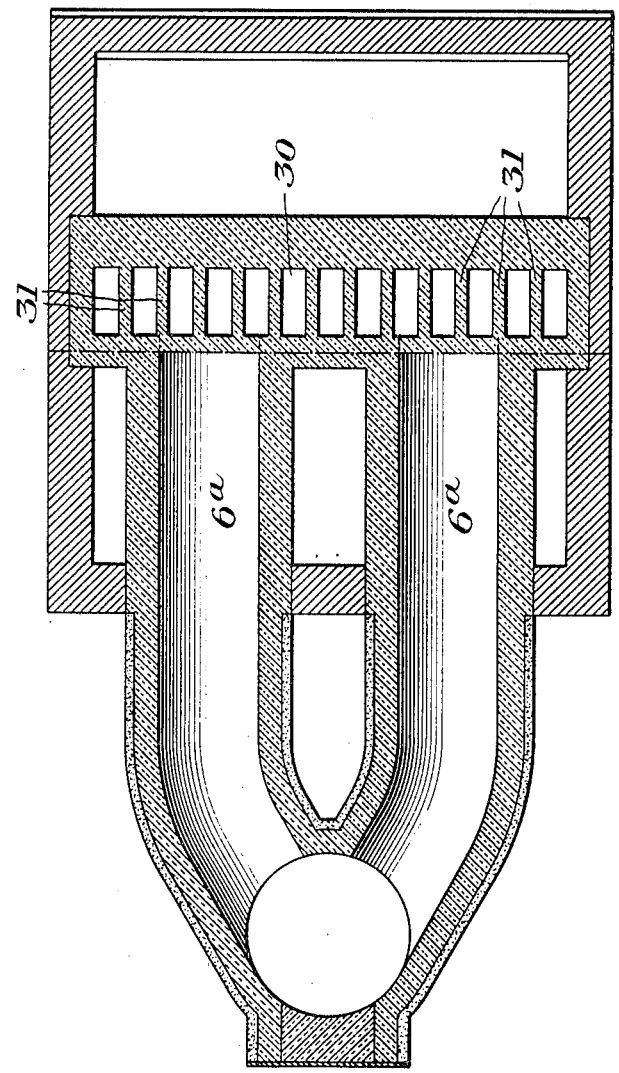

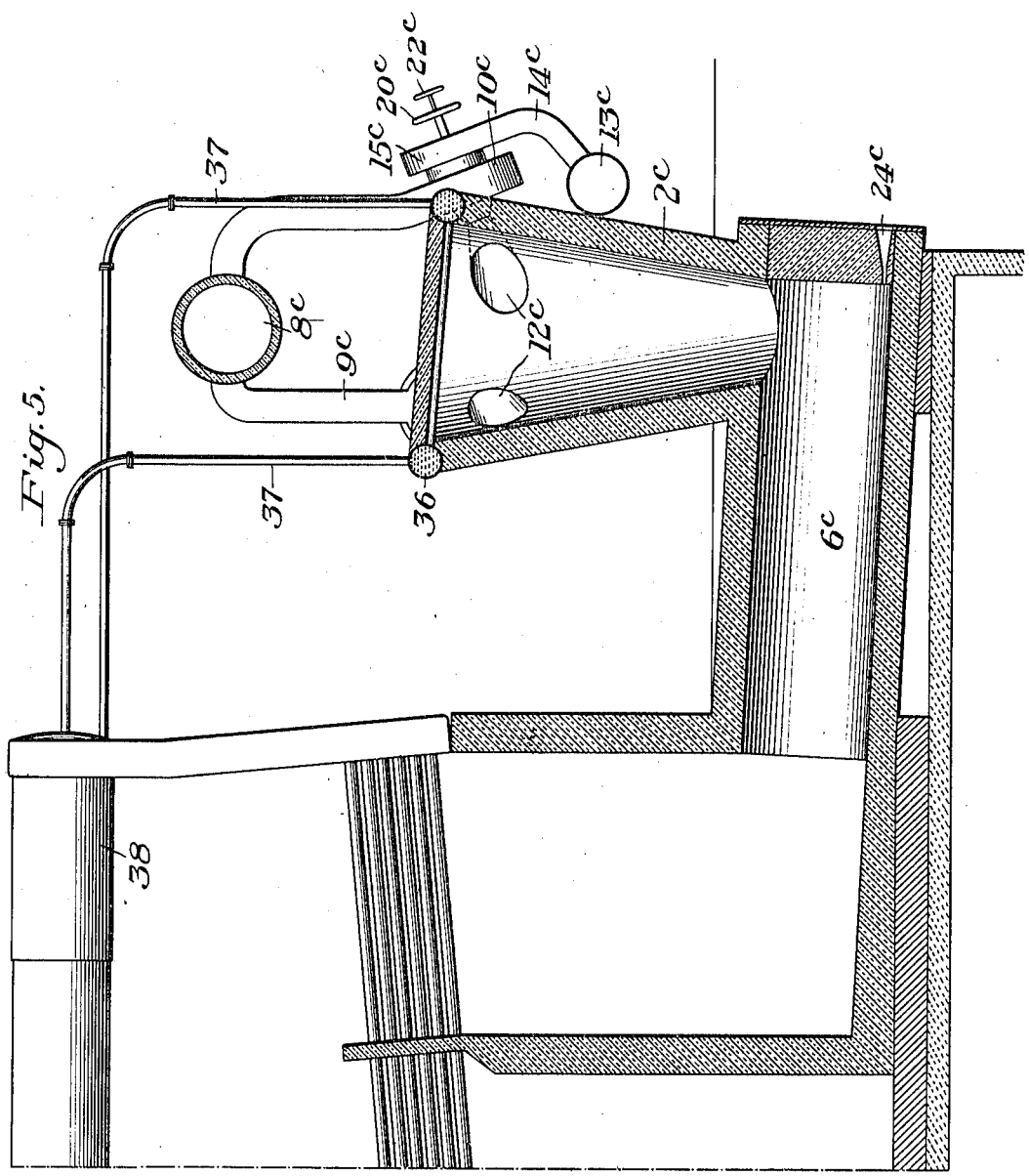

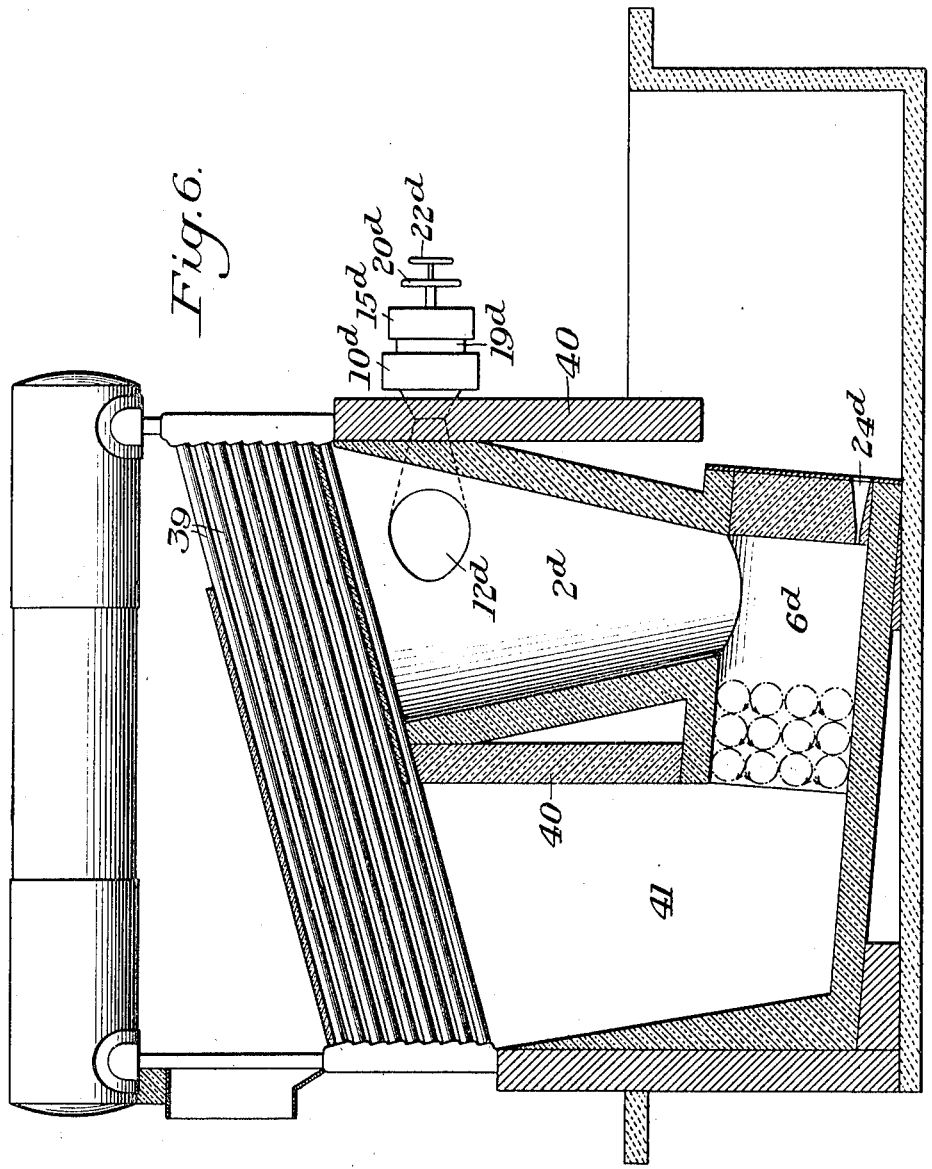

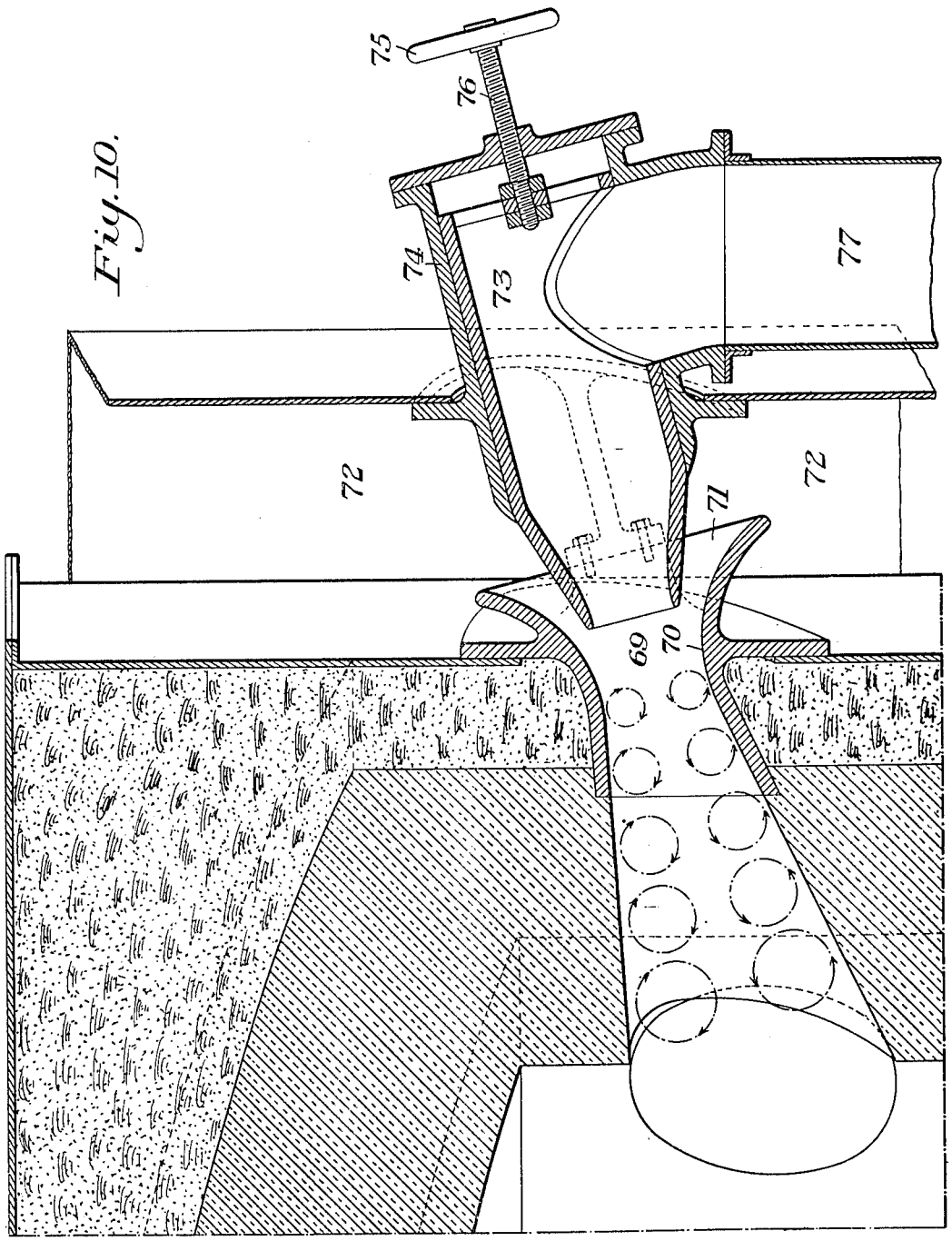

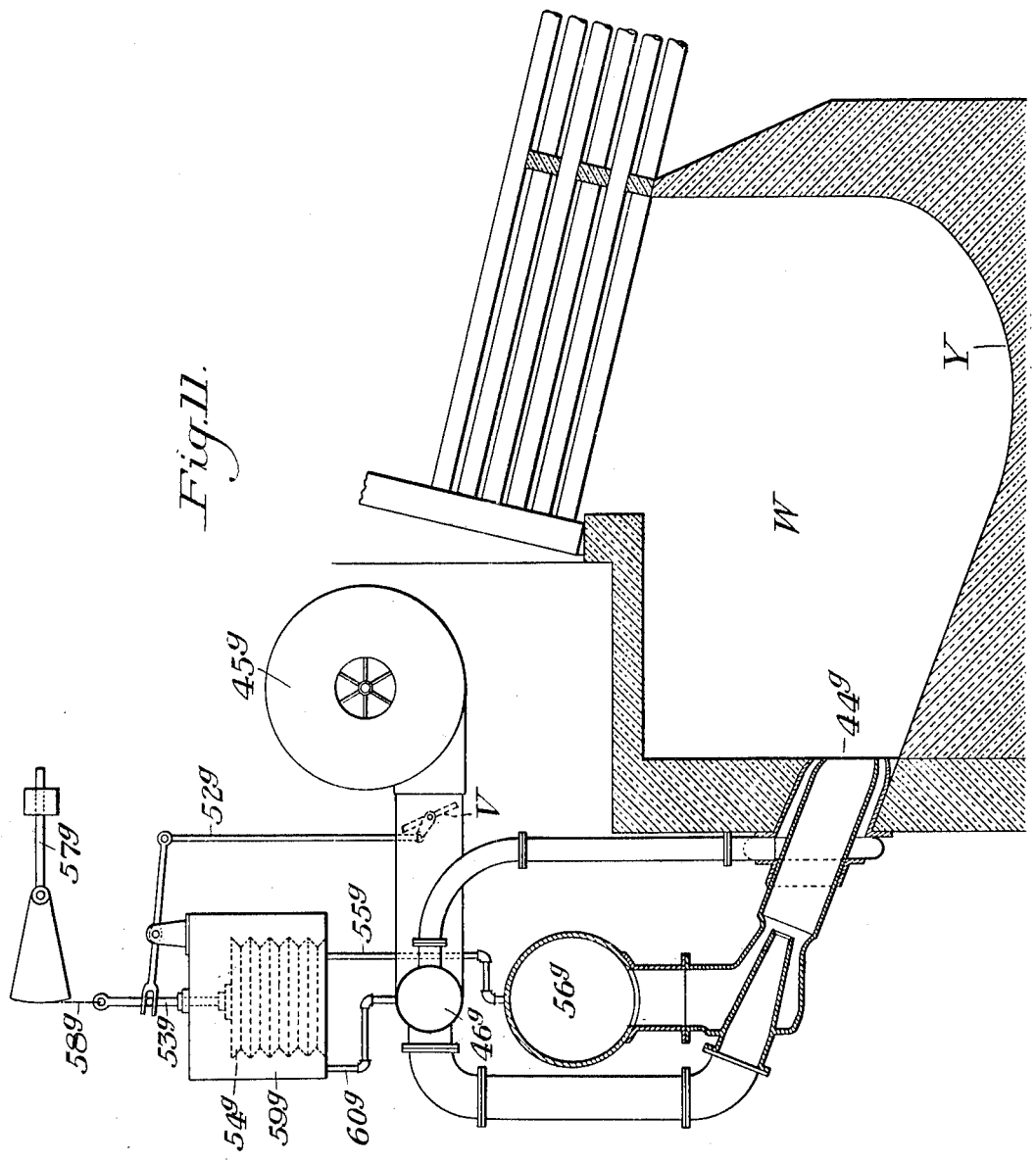

UNITED STATES PATENT OFFICE.

JOHN E. BELL, OF NEW YORK, N. Y.

FURNACE.

1,313,779.  Specification of Letters Patent.  Patented Aug. 19, 1919.

Application filed August 7, 1915. Serial No. 44,196.

*To all whom it may concern:*

Be it known that I, JOHN E. BELL, a citizen of the United States, residing at New York, in the county and State of New York, have invented a new and useful Improvement in Furnaces, of which the following is a full, clear, and exact description, reference being had to the accompanying drawings, forming part of this specification, in which—

Figure 1 is a sectional elevation showing my invention applied to one form of boiler furnace.

Fig. 1ª is a detail sectional view of one of the burner nozzles.

Fig. 2 is a section on the line II—II of Fig. 1, on a larger scale.

Fig. 3 is a view similar to Fig. 1, but showing a modified form of the furnace and a different type of boiler.

Fig. 3ª is also a view similar to Fig. 1, but showing a modification.

Fig. 4 is a section on the irregular line IV—IV of Fig. 3.

Fig. 5 is a sectional elevation showing another form of my invention applied to a different type of boiler.

Fig. 6 is a similar view showing still another form.

Fig. 7 is a similar view showing still another form, and also illustrating a controlling apparatus for the air.

Fig. 8 is a sectional view showing still another form of the invention.

Fig. 9 is a detail sectional view of another form of the primary mixing chamber.

Fig. 10 is a vertical section showing another form of air and gas inlet nozzle, and Fig. 11 is a sectional elevation showing another form of air regulator, the latter being shown largely diagrammatically.

My invention has relation to furnaces; and while furnaces embodying my invention may be used for burning a variety of fuels, such as powdered coal, natural gas, or coke oven gas, it has been more especially designed for burning blast furnace gas.

At the present time blast furnace gas is usually burned in ordinary boiler furnaces, the grates being either covered with a very slow fire, or with brickwork. The gas, and part of the air supply passes through burners placed over the fire doors, and an attempt is made to mix the gas and air as they pass through the burners. Experience has shown that the capacity of both the burners and the furnace is limited; and as a consequence, it has been necessary to use relatively wide boilers, so as to provide ample area in the fronts for the placing of the burners. Recent developments in boiler work have, however, shown the very marked advantages of boilers that are high and narrow for use with waste heat, or with fuels producing a low furnace temperature; and it is this type of boiler which should be used with blast furnace gas.

When a boiler is fired by coal, a high temperature is maintained in the furnace, and a large proportion, amounting sometimes to as much as fifty per cent. of the heat, goes direct from the fuel bed to the boiler heating surface by radiation. Under such conditions, the necessity for rapid transfer of heat between the gas and the boiler heating furnaces is not so evident. When, however, the proportion of heat absorbed by radiation is reduced, the defects of the boiler are magnified, and the desirability of the improved construction is emphasized.

Radiation in a coal-fired furnace is largely from the fuel bed having a surface temperature of above 3000 degrees F. If the radiating surface is reduced in temperature from 3000 degrees F. to 2500 degrees F., the heat radiated is cut down to one-half of its former amount, and if the temperature be reduced to 2000 degrees F. the radiation would be reduced three-fourths. The mean temperature of the furnaces now burning blast furnace gas is considerably below 2000 degrees F.; and as a consequence the radiation effect, as compared with what takes place in coal-fired boilers, is practically negligible. It therefore becomes necessary, when the maximum economy is sought, to use a narrow boiler with a long pass, giving a high heat transfer rate between the gases of combustion and the tube surfaces. It has heretofore been impossible to do this, on account of the inability to burn the necessary amount of gas to develop the rated capacity. The criticism of the present burners and furnaces on account of their lack of capacity, is, however, really a minor criticism. The most objectionable feature is the inability to burn the gas in the furnace.

Using as fuel a gas running 105 B. T. U.'s per cubic foot, a boiler of the Stirling or Rust type, having a transfer rate of about 3¾ B. T. U.'s, would, if the gas was completely burned in the furnace with no excess air, show flue gas temperatures at a rating of from 500 degrees F. to 575 degrees F. Actual tests, however, of these boilers show flue gas temperature from 700 degrees F. to 1000 degrees F. These high temperatures come when an attempt is made to reduce the excess air, and follows from the fact that the combustion is not then completed in the furnace, but is carried through the boiler; and the farther back the flame is carried, the higher the flue gas temperatures. In the ordinary boiler furnace, the mixing necessary for complete combustion cannot be obtained with natural draft. The gas may, however, be readily burned with a forced draft, and perfect combustion obtained with little or no excess air; and this combustion seems to take place almost immediately. In the furnace of my invention, I take advantage of these facts to insure a perfect mixture of the gas and a complete combustion in the furnace at the maximum obtainable temperature.

Dust carried by blast furnace gas has been detrimental to boiler efficiency, as it deposits on the heating surfaces. This trouble has been so great as to make it desirable to wash the gas before it goes to the boilers, freeing it as much as possible from dust. In doing this, the sensible heat of the gas, which is that corresponding to a temperature of about 300 degrees F., is lost. If this could be utilized, it would increase the available temperature of the gas some 200 degrees F., and would elevate the furnace temperature sufficiently to show an approximate gain in efficiency of about five per cent. A further object of my invention is, therefore, to provide a furnace in which the gas can be burned without washing it.

Further, the gas is not delivered to the furnace at a uniform pressure. By reason of various incidents of operation of the furnace, the variations are over quite a wide range. Consequently, if the air supply to the burners is adjusted for one gas pressure, a change in the pressure disturbs the adjustment, and a loss occurs, due either to excess air or to imperfect combustion. In my furnace I have provided means to furnish all the air for combustion by a fan or blower, and to automatically cause the gas pressure to regulate the air supply. This can be done in various ways when a forced draft is employed, but cannot be practically carried out with a natural draft.

Another advantage in the use of a blast over natural draft, is that it is possible to utilize, either through a recuperator or a regenerator, a portion of the heat in the flue gases for heating the air supply. This is not, however, an economical proposition with a boiler having a high transfer rate, as the flue gas temperatures are then so low as to make the investment in a recuperator or regenerator unremunerative.

On account of the motion given the gases in my improved furnace, I have termed it a "vortex" furnace. In the accompanying drawings, I have illustrated several embodiments of this furnace applied to different forms of boilers. My improved furnace is also applicable, however, to soaking pits, heating furnaces, hot stoves, etc.

Referring first to that form of my invention shown in Figs. 1 and 2, which show the application of the invention to an Edge Moor boiler, the numeral 2 designates the furnace proper which, in shape is preferably an inverted truncated cone with a convex top. It is preferably constructed with an outside steel plate 3, inside of which is a layer 4, preferably of magnesia, and an inner lining 5 of firebrick. The steel plate should be heavy enough to withstand the effects of internal explosions. By using a layer of magnesia of a thickness, say, of three inches, with a firebrick lining of about nine inches in thickness, the combined conductivity of the two may be made substantially equivalent to that of a firebrick wall thirty-nine inches thick, and sufficient to withstand an internal temperature of from 2400 degrees F. to 2500 degrees F. without excessive loss. At its lower end this furnace, the interior chamber of which forms what I term the primary mixing and combustion chamber, opens into a flue 6, preferably circular and slightly inclined to the horizontal. This flue at its outer end opens into the space in the boiler setting which is usually allotted to the furnace, and which, with my invention, is preferably filled up with firebrick checkerwork 7 to increase the radiation effect. The firebrick absorbs the heat from the hot gas and radiates it to the boiler surfaces. In this form of my invention, I have shown the flue 6 as inclined downwardly away from the checkerwork 7.

I provide a plurality of burner nozzles arranged around the top of the furnace so that a mixed blast of gas and air is delivered into the furnace chamber approximately tangentially to the perimeter of the internal surface of the furnace. The blasts are arranged to act all in one direction. Any suitable form of burner nozzle may be employed. In Figs. 1 and 2 I have shown the gas as coming from a supply pipe or main 8 from which hollow connections 9 extend into the gas boxes 10 having the nozzles 11 communicating with the openings 12 which enter the furnace chamber tangentially. 13 is an air supply pipe surrounding the furnace and having a connection 14 with an air box 15 at each burner, each of these air boxes having a nozzle 16 which is arranged concentrically within the nozzle 11. The bustle pipe 13 may be supplied with air through the connection 17 having a controlling valve 18. In Fig. 2 I have shown the boiler as having two of my improved furnaces attached thereto, the two furnaces being of corresponding construction, and similar parts being given similar letters in each.

The burner nozzles are designed to utilize part of the kinetic energy of the air blast in assisting the gas flow. The minimum area for the passage of both the gas and the air in the passages is at the nozzle, so that the jet effect in the flow of a perfect fluid is approximated. The nozzle 11 is constricted somewhat beyond the point of first contact between the air and the gas, so that the air jet can exert a suction action on the gas. From this point of constriction into the combustion chamber, the passage is gradually widened to obtain a partial conversion of the kinetic energy into velocity. For adjusting the gas supply, the air nozzle 16 may be moved as a whole. For this purpose it is carried by sleeve or drum 19 to which is connected an adjusting wheel 20, this sleeve or drum being carried by the metal work of the air chamber. (See Fig. 2.) The movable air nozzle also preferably carries a controlling air plug or valve 21 which is separately adjusted, as by the hand wheel 22. (See Fig. 2.) These adjustments are not for cutting off entirely either the air or the gas supply, but are designed to regulate them with the least possible loss of pressure due to wire drawing.

The mixed air and gas will be delivered to the burner nozzles at a high velocity, which is preferably at least equal to the critical flow velocity through a circular pipe of that diameter. The purpose is to provide within the nozzles 11 and through the ports 12, as well as in the primary mixing chamber and within the flues 6, a vortex or eddy motion. This vortex motion at and beyond the nozzle is indicated by the dotted circles in Fig. 10. The vortex motion in the flue connecting the furnace with the boiler setting is indicated in a similar way in Fig. 6. This vortex action is believed to exist in all the forms of my invention shown. This rotary or vortex motion not only insures a thorough mixing of the air and gas in a highly effective manner, but it also tends to cause a separation of the dust carried by the gas, and to lodge it on the side walls. The temperature in the furnace is such that this dust is in a fluid, or semi-fluid, condition, such that when brought in contact with a surface it will adhere thereto. It will be sufficiently fluid to cause the slag formed by the dust to flow by gravity through the primary mixing chamber into the connecting flue at the bottom. In the event, however, that the slag does not run properly, I may blow in with the air blast some suitable fluxing material such as chalk, lime, or crushed oyster shells, etc. The dust will not be entirely removed in the primary mixing or combustion chamber, but as the pressure in the furnace forces the gases out of the constricted neck 2ª of the furnace and through the horizontal connecting flue (the areas of both of which are such as to cause the vortex motion above described) there is a strong tendency to sweep the dust out of the gases and deposit it on the walls of the flue 6 where it collects in the bath of slag (indicated at 23 in Fig. 1) which it is proposed to maintain in the bottom of this flue. This slag may be drained out from time to time into a suitable pit 23ª by means of the slag hole 24. Any dust which is carried through the flue 6 is deposited on the checkerwork 7 in the chamber under the boiler.

The surface of the flue forming this secondary mixing and combustion chamber should, for the best results, be proportioned to the amount of gas consumed; or, more properly, to the amount of dust which passes through the furnace. I prefer that the surface area of the flue is such that there will be at least one square foot of such surface for one cubic foot of volume in the furnace chamber 2.

By noting the direction of the vortex circles in Figs. 6 and 10 the strong centrifugal action (which I believe occurs) tending to throw the dust out of suspension in the gas and cause it to be deposited in the manner described will be apparent. By collecting the dust in this manner and preventing it from depositing on the heating surfaces of the boiler, raw gas may be used without washing. With washed gas, the provisions made for removing the dust are unnecessary, but no modification is required in the furnace construction, as the same motion which removes the dust is also a motion which it is desired to employ to mix the gas and air in a manner to insure perfect combustion.

By using a furnace of this type, blast furnace or producer gas may be burned with very nearly perfect combustion prior to the time the gases contact with the surfaces of the boiler; and this can be done with a minimum air supply. This air supply may, as hereinafter described, be controlled so as to automatically adjust it for changes in gas pressure. I believe it to be possible in this furnace to maintain a sufficiently high temperature to insure the brickwork in the boiler setting underneath the heating surfaces of the boiler to be at a temperature that will radiate a material amount of heat to the boiler, and without fouling the heating surfaces, even with raw gas.

The furnace is adapted for use with high narrow boilers and, as above indicated, can be employed for burning other fuels. It can be used either with or without air pre-heating means. Wherever necessary, the walls of the furnace can be provided with water cooled surfaces especially in burning powdered coal, natural, or coke oven, gas. In burning powdered coal, it is believed that sufficiently high temperatures may be maintained to slag the ash, thus getting rid of one of the great difficulties heretofore existing in the use of such fuel.

In Fig. 3 I have shown my invention as applied to a boiler of the Stirling type. The construction of the furnace is substantially the same as in Figs. 1 and 2, and corresponding parts in Fig. 3 are given the same reference numerals with the exponent "a" applied thereto. I have, however, in this view shown the top of the furnace as having an auxiliary air supply connection 25. I have also shown the top and bottom portions of the furnace as provided with the water jackets 26 having circulating connections 27. The top jacket 26 may have a steam pipe connection 28 with one of the upper drums 29 of the boiler.

Instead of having checkerwork as in Figs. 1 and 2, it has the vertical passage 30 communicating with the delivery end of the flue $6^a$, and I may divide this chamber by a series of vertical partitions 31 set on the supports 32 in order to give, in some measure, a checkerwork effect. The arrangement of these partitions will be readily understood from Figs. 3 and 4. I have also in these figures indicated a single furnace supplying two of the flues $6^a$ which branch from each other below the constricted opening at the bottom of the furnace proper. These flues, as in the form first described, constitute what may be termed the secondary mixing and combustion chamber. Fig. 3 also indicates supplementary grates 33 for coal-firing the boiler, although these grates are not ordinarily necessary. This arrangement is, however, sometimes required by boiler users.

Fig. $3^a$ shows an arrangement which is very generally similar to that shown in Fig. 3, except that the flue $6^b$ which forms the secondary combustion and mixing chamber is inclined in the reverse direction to that shown in Fig. 3. The uptake passage $30^b$ is also shown as having a slag pit 34 at the bottom, into which the flue $6^b$ may drain, and which also serves to catch any drainage from the walls and partitions in the uptake $30^b$. In this figure the supplemental grates for coal-firing are omitted; the boiler setting 35 is of somewhat modified construction;
and the water cooling has been omitted from the furnace. The latter is also shown as having a larger number of the inlet openings $12^b$.

Fig. 5 shows the application of my invention to still another form of boiler; this form, however, not differing in principle from the forms previously described. It is generally similar to the form shown in Fig. 1, except that the checkerwork below the boiler heating surfaces is omitted; and the upper portion of the furnace is shown as having the water cooled top ring 36 provided with circulating connections 37 with the upper drum 38. Other parts corresponding to similar parts shown in Fig. 1 are given the same reference numeral, with the exponent "c" added thereto.

Fig. 6 shows a form of my invention in which, instead of placing the furnace outside of the boiler setting, it is placed within the boiler setting and below the upper portion of the tubes 39. The furnace $2^d$ is similar in form to that previously shown, being placed between the setting walls 40 and opening at its bottom into the flue $6^d$ which is inclined upwardly to discharge into the chamber 41 below the lower portions of the tubes 39.

Fig. 7 shows another form of my invention in which the primary mixing and combustion chamber $2^e$ is located within the boiler setting, the top wall 42 of this chamber extending only partially across the chamber 43 in the setting. The mixed gas and air enter through a plurality of nozzles 44 at one end. The mixed air and gases are given the same rotary vortex motion in the chamber $2^e$ as in the preceding forms, but instead of passing out in the restricted end of the chamber, pass out around the roof arch 42. One of the main purposes of this figure of the drawings is to illustrate one suitable form of automatic regulator for regulating the blast in accordance with variations in the gas pressure. This form of regulator, or any other suitable regulator, may be applied to any of the forms of my invention. In this figure 45 designates the fan which supplies the blast pipe 46 having connection with the air boxes 47 of the nozzles 44. This fan is driven by the engine indicated diagrammatically at 48, having the live steam supply connection 49 and an exhaust connection 50. The pipe 49 has a control valve 51, whose stem is connected by the system of levers 52 with the stem 53 of a bellows-like diaphragm 54 having an internal supply connection 55 with the gas main 56. The diaphragm 54 may have the counterbalancing weight device 57 connected to the stem 53 by flexible connection 58. The diaphragm 54 is placed within a closed chamber 59 having a pipe connection 60 with the blast pipe 46.

It will be readily seen that the movement of the diaphragm 54 will be controlled automatically by the pressure in the gas main 56 and that variations in this pressure will actuate the valve 51 to thereby control the engine 48 so that as the gas pressure diminishes the engine will be slowed down, and as the gas pressure increases the engine and fan will be speeded up. In this way the proper proportions of gas and air are maintained.

In Fig. 11 I have shown another form of automatic air regulator. In this figure the parts of the regulator are in general similar to those shown in Fig. 7, and corresponding parts are given the same reference numerals with the exponent "g" added thereto. The essential difference is that the regulator, instead of controlling the engine which drives the fan or blower, controls a valve V located in the connection from the fan 45$^g$ to the blast pipe 46$^g$.

In this figure I have also shown the air and gas nozzles as discharging directly into a mixing and combustion chamber W. The walls of this chamber against which the entering air and gas strike are given the curved form shown at Y, whereby a vortex action is produced, although to a somewhat lesser extent than in the preceding figures.

Fig. 8 shows another form of my invention in which the furnace 2$^f$ is located within the boiler setting in substantially the same manner as Fig. 6. This arrangement is particularly adapted for burning powdered fuel. Each of the tangential inlets 12$^f$ for the air and fuel may be supplied by a hopper 61 through a suitable feeding device 62, the air supply coming from the blast main 63 and having the regulating device 64. 65 designates water cooling means for the wall of the furnace 2$^f$.

Fig. 9 shows another form of the furnace in which the entire top 66 consists of a hollow water cooled member having the branched inlet connection 67 and the outlet connection 68.

Fig. 10 illustrates another form of burner which may be employed. In the construction shown shown in this figure the gas inlet nozzle 69 has the constricted portion at 70 just beyond where the air and gas first meet, the outer end portion 71 of the nozzle opening into the gas box 72. 73 is the air nozzle which is slidably mounted in the casing 74 and can be adjusted by means of the wheel 75 and screw 76 to vary the amount of air entering the nozzle from the air supply connection 77. Movement of the nozzle 73, relatively to the nozzle 69, varies the inlet area of nozzle 69 proportionately to the change of the area in the air inlet. In this manner the air and gas are properly regulated by the one adjustment, instead of by two separate adjustments as in the preceding forms. I may, however, use any suitable form of burners.

In burning fuel such as blast furnace gas or ordinary producer gas, the temperature of combustion, even with no excess air, is within the limits of temperature that a refractory substance such as fire brick can withstand. When fuels such as these are burned, I line the inside surface of the combustion chamber completely with such materials. When, however, fuels such as natural gas, by-product coke oven gas or powdered coal are used as fuel the combustion temperatures, even with some excess air, are higher than the commonly used refractory materials can stand, and when these fuels are used I make part of the lining of the combustion chamber a water cooled surface. This surface may be formed by the lower tubes of a water tube boiler, as in Fig. 6, or may be composed of water tubes connected to the boiler so as to form a circulation independent of the main circulation in the boiler, as shown in Figs. 5 and 8; or I may use a shell water cooled surface, as in Fig. 9. The radiant heat falling on these water cooled surfaces is immediately absorbed and the heat available for raising the temperature of the gases of combustion is reduced. By the proper disposition and proportion of area, therefore, of these water cooled surfaces I can limit the rise in temperature of the refractory material forming the remainder of the lining of the furnace to a temperature lower than its fusing point.

The advantages of my invention will be appreciated by those skilled in the art, owing to the greatly increased efficiency resulting from its use.

I claim:

1. A furnace of the character described, comprising a primary mixing and combustion chamber having a restricted outlet, means for introducing fuel into said chamber mixed with air to produce a vortex action within the chamber, and a secondary mixing and combustion chamber connected to said restricted outlet and leading to heating apparatus, said chamber being approximately circular in cross section and extending in a generally horizontal direction, said secondary chamber having means for permitting the removal of slag or dust therefrom, substantially as described.

2. A furnace of the character described, comprising a primary mixing and combustion chamber of diminishing cross sectional area toward its lower end, means for introducing fuel mixed with air tangentially into the opposite end portion of said chamber, and a secondary mixing and combustion chamber communicating with the lower end portion of the primary chamber and extending in a generally horizontal direction, said chamber being approximately circular in cross section and having means for the removal of accumulated slag and dust therefrom, substantially as described.

3. A furnace, comprising a primary mixing and combustion chamber having a restricted constantly open outlet, means for introducing fuel into said chamber mixed with air, and a secondary mixing and combustion chamber connected to said restricted outlet, said secondary chamber being in the form of a relatively long flue of approximately circular cross section, heating apparatus to which said flue is connected, and a plurality of heat absorbing surfaces through which the products of combustion pass from the secondary chamber to the heating surfaces of the heating apparatus, substantially as described.

4. Apparatus for burning blast furnace gas, comprising a primary mixing and combustion chamber, a gas delivery nozzle extending tangentially into said chamber, means for supplying air to said chamber, said chamber being of gradually decreasing cross sectional area toward its discharge end, and a secondary combustion chamber communicating with said discharge, said secondary chamber being in the form of a relatively long generally horizontal flue having walls upon which dust may collect, and means for controlling the velocity of the gases passing through said chamber whereby the major portion of the dust contained in the supplied blast furnace gas will be deposited on the walls of said secondary chamber, together with means whereby the dust, or slag produced thereby, may be removed from said secondary chamber, substantially as described.

5. A furnace, comprising a primary mixing and combustion chamber having a restricted outlet at one end portion, and fuel and air inlet openings at the opposite end portion, means for introducing air and fuel at a high velocity through said openings to create a vortex motion within said chamber, and a secondary mixing and combustion chamber into which the products of the primary chamber are delivered, said combustion chamber consisting of a flue of circular form and extending in a general horizontal direction but inclined from one end toward the other to give a slag discharge, substantially as described.

6. A furnace of the character described, comprising a primary mixing and combustion chamber having a restricted outlet approximately circular in cross section, means for introducing fuel into said chamber mixed with air to produce a vortex action within the chamber, and a secondary mixing and combustion chamber connected to said restricted outlet and leading to heating apparatus, said chamber being approximately circular in cross section and extending in a generally horizontal direction, said secondary chamber having means for permitting the removal of slag or dust therefrom, substantially as described.

In testimony whereof, I have hereunto set my hand.

JOHN E. BELL.

Witnesses:
 EMERSON G. HESS,
 JESSE B. HELLER.